US012687169B2

(12) United States Patent
Ryu et al.

(10) Patent No.: US 12,687,169 B2
(45) Date of Patent: Jul. 21, 2026

(54) ELECTRIC MOTOR-INTEGRATED ROCKET ENGINE PUMP

(71) Applicant: INDUSTRY-UNIVERSITY COOPERATION FOUNDATION HANYANG UNIVERSITY ERICA CAMPUS, Ansan-si (KR)

(72) Inventors: Keun Ryu, Seoul (KR); Ho Won Yi, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 267 days.

(21) Appl. No.: 18/304,860

(22) Filed: Apr. 21, 2023

(65) Prior Publication Data

US 2023/0258189 A1     Aug. 17, 2023

Related U.S. Application Data

(63) Continuation of application No. PCT/KR2021/017344, filed on Nov. 24, 2021.

(51) Int. Cl.
F04D 13/06      (2006.01)
F02K 9/46      (2006.01)
(Continued)

(52) U.S. Cl.
CPC ............... F04D 13/06 (2013.01); F02K 9/46 (2013.01); F04D 29/0413 (2013.01); F04D 29/057 (2013.01)

(58) Field of Classification Search
CPC ........... F04D 13/06; F04D 25/06–0606; F04D 25/062; F04D 25/064; F04D 29/0413;
(Continued)

(56) References Cited

U.S. PATENT DOCUMENTS 4,644,207 A * 2/1987 Catterfeld .............. H02K 16/02
                                                310/156.37
5,697,767 A * 12/1997 Bissell .................... F04D 13/14
                                                417/409
(Continued)

FOREIGN PATENT DOCUMENTS

CN      103650226 B * 4/2016      ......... F04D 25/0606
CN      105811609 A * 7/2016      ........... F04D 13/086
(Continued)

OTHER PUBLICATIONS

International Search Report for PCT/KR2021/017344 dated Mar. 3, 2022.

*Primary Examiner* — Alexander B Comley
(74) *Attorney, Agent, or Firm* — Sughrue Mion, PLLC

(57) ABSTRACT

Provided is an electric motor-integrated rocket engine pump. The electric motor-integrated rocket engine pump includes: a housing; a rotating body provided in one direction inside the housing; an electric motor provided inside the housing, and integrally shaft-coupled to the rotating body; and a plurality of fluid bearings are mounted on a front rotating body and a rear rotating body of the electric motor to support rotation of the rotating body.

13 Claims, 7 Drawing Sheets

(51) Int. Cl.
    *F04D 29/041*      (2006.01)
    *F04D 29/057*      (2006.01)

(58) Field of Classification Search
    CPC ........ F04D 29/043; F04D 29/057; F02K 9/46;
            H02K 21/12–20; F16C 32/06–0607
    See application file for complete search history.

(56)           References Cited

U.S. PATENT DOCUMENTS

| | | | | |
|---|---|---|---|---|
| 9,664,050 | B2 * | 5/2017 | Hippen | F01D 25/166 |
| 10,527,003 | B1 * | 1/2020 | Beck | B23K 26/342 |
| 2005/0096141 | A1 * | 5/2005 | Ishii | F16C 3/02 |
| | | | | 464/183 |
| 2015/0145365 | A1 * | 5/2015 | Fujii | H02K 1/276 |
| | | | | 310/156.01 |
| 2016/0195039 | A1 * | 7/2016 | Danguy | F02K 9/46 |
| | | | | 60/259 |
| 2017/0002825 | A1 * | 1/2017 | Sorokes | F04D 25/06 |
| 2018/0062467 | A1 * | 3/2018 | Barthes | H02K 1/2726 |
| 2018/0069451 | A1 * | 3/2018 | Garrard | H02K 1/02 |
| 2019/0285073 | A1 * | 9/2019 | Lee | H02K 7/1823 |
| 2020/0056616 | A1 * | 2/2020 | Di Serio | F04D 13/0633 |

FOREIGN PATENT DOCUMENTS

| | | | | |
|---|---|---|---|---|
| CN | 107237760 A | * | 10/2017 | ............. F04D 13/06 |
| CN | 109083844 A | * | 12/2018 | .............. F04D 1/00 |
| CN | 111140509 A | * | 5/2020 | .............. F02K 9/46 |
| CN | 111697783 A | * | 9/2020 | ............. H02K 11/30 |
| EP | 0530573 A1 | * | 3/1993 | |
| JP | 2005248799 A | * | 9/2005 | |
| JP | 6206385 B2 | * | 10/2017 | ............. F01D 15/00 |
| JP | 2019163013 A | * | 9/2019 | |
| KR | 20100033857 A | * | 3/2010 | |
| KR | 10-2010-0109720 A | | 10/2010 | |
| KR | 20100109720 A | * | 10/2010 | |
| KR | 101025773 B1 | * | 4/2011 | |
| KR | 10-2012-0045736 A | | 5/2012 | |
| KR | 101257949 B1 | * | 4/2013 | |
| KR | 101324226 B1 | * | 11/2013 | |
| KR | 101408341 B1 | * | 6/2014 | |
| KR | 101682418 B1 | * | 12/2016 | |
| KR | 20170129547 A | * | 11/2017 | |
| KR | 10-2018-0018180 A | | 2/2018 | |
| KR | 20180018180 A | * | 2/2018 | |
| KR | 10-1981424 B1 | | 5/2019 | |
| KR | 10-2019-0108825 A | | 9/2019 | |
| WO | WO-2006084268 A1 | * | 8/2006 | ........... F04D 13/027 |

* cited by examiner

[FIG. 1]
100
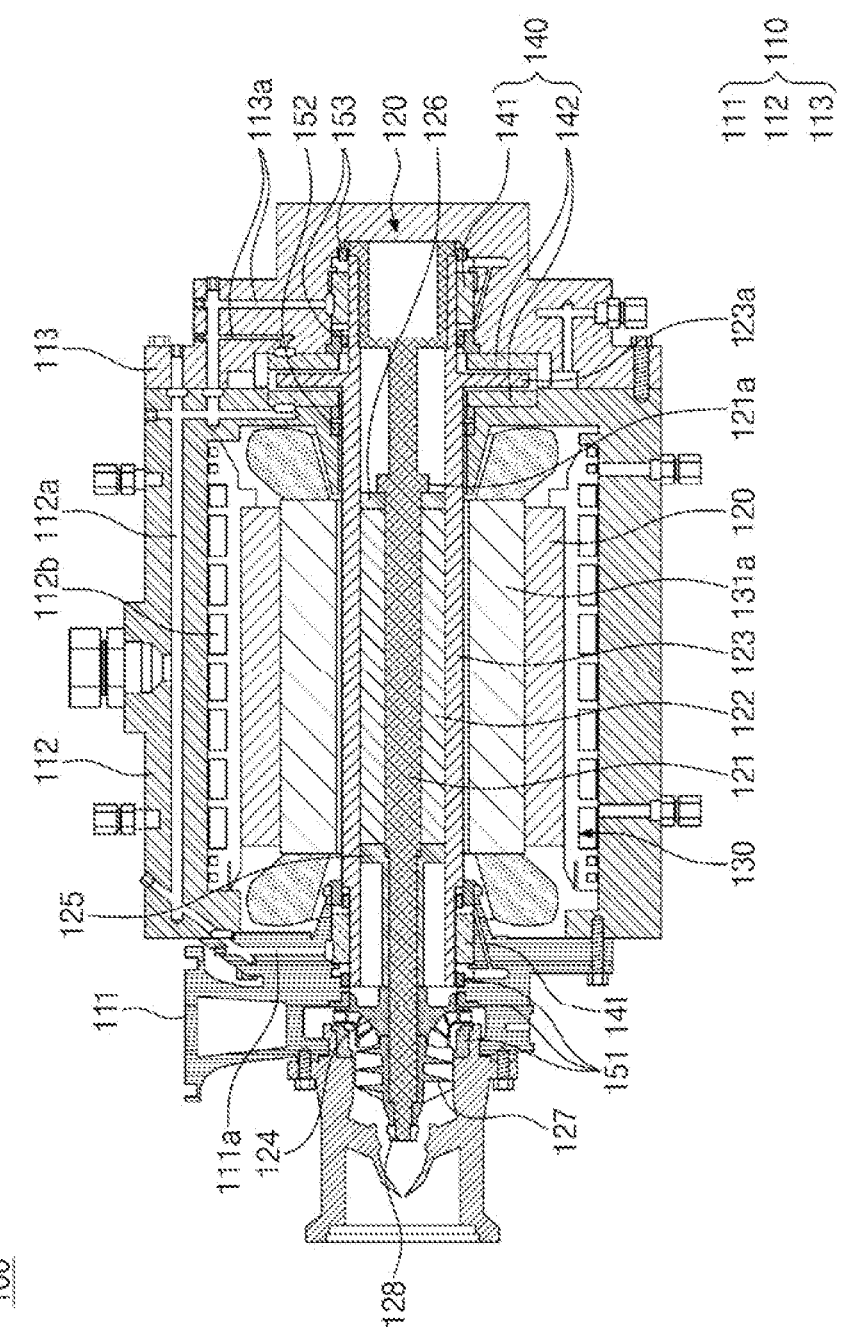

[FIG. 2]
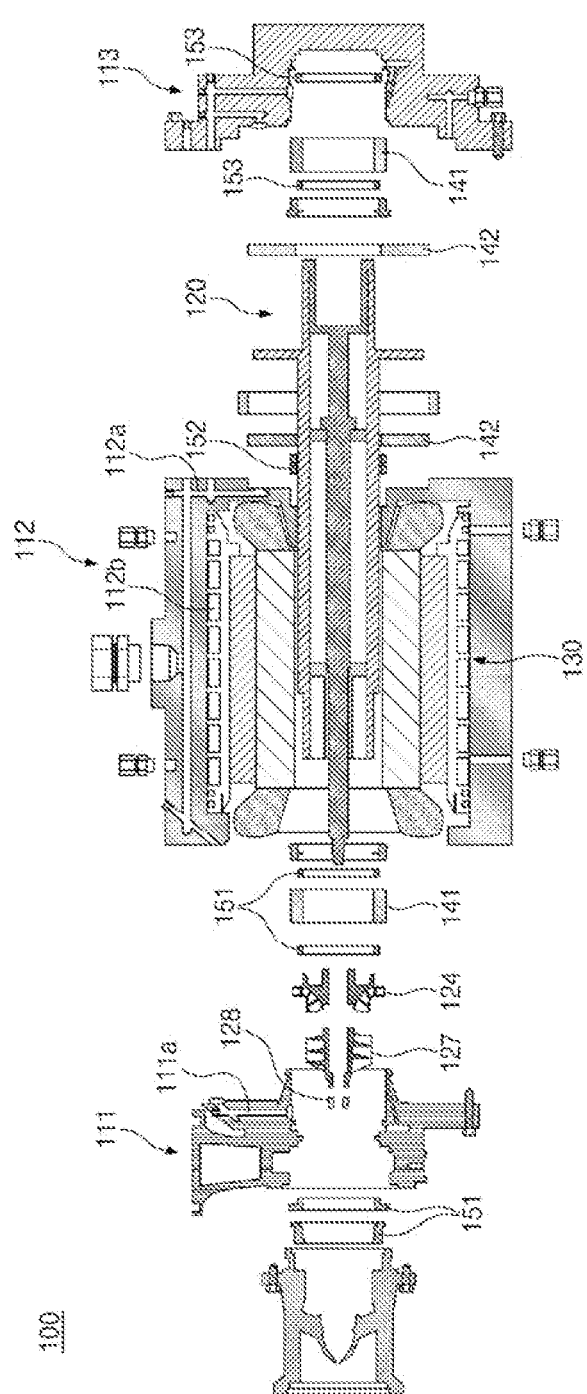

【FIG.3】
120
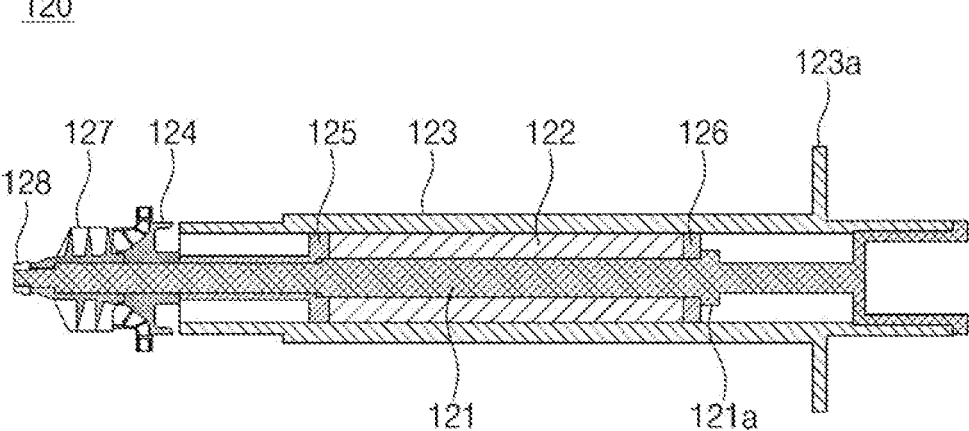

【FIG.4】
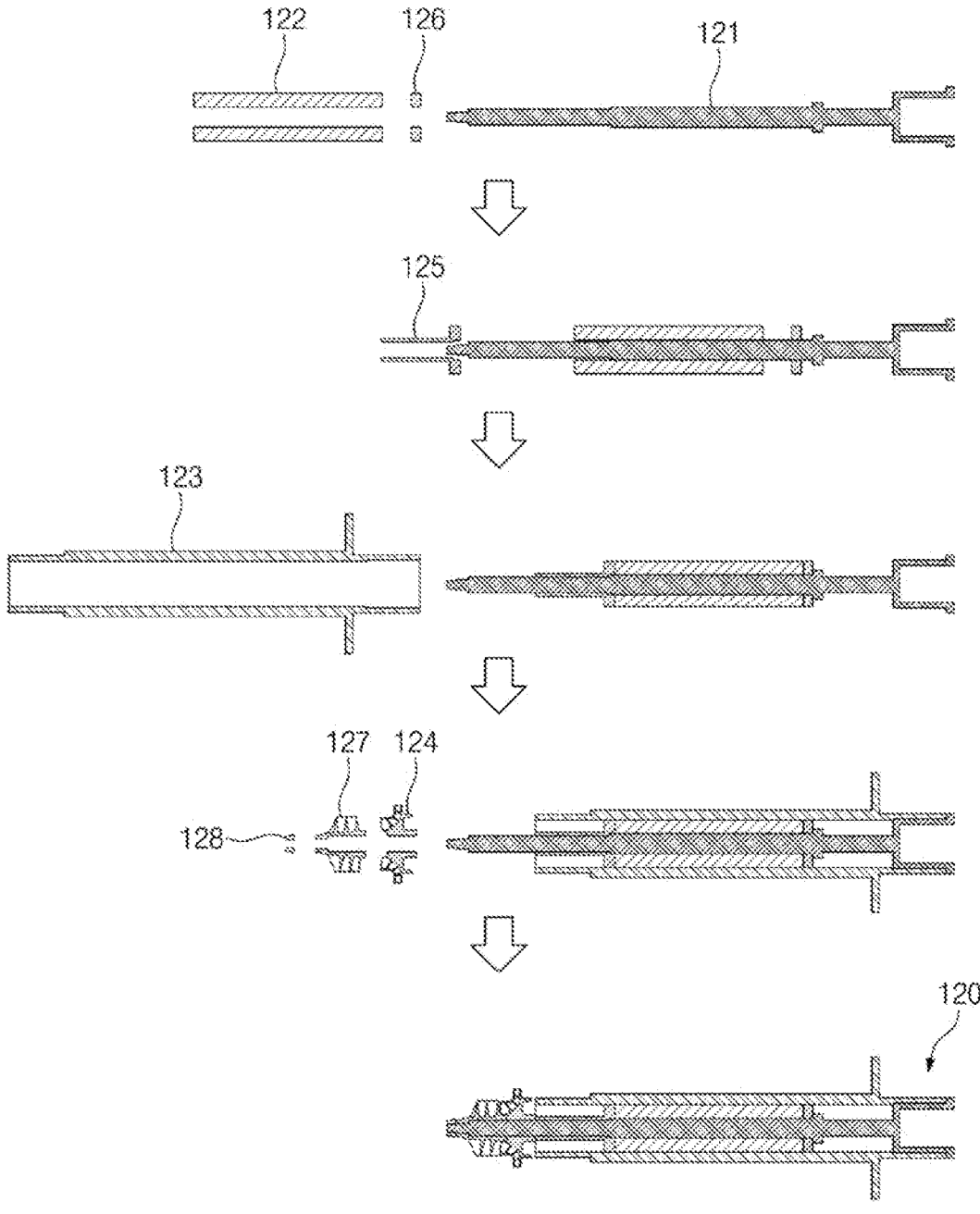

【FIG.5】
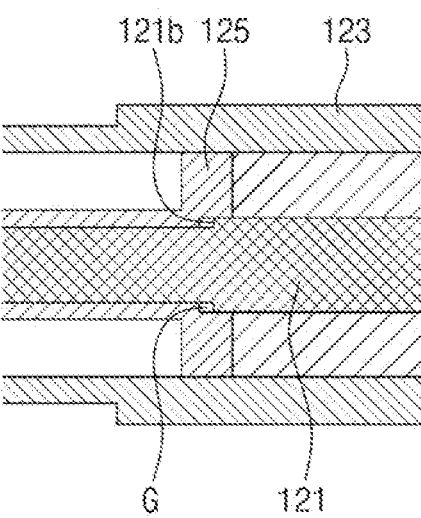

【FIG.6】
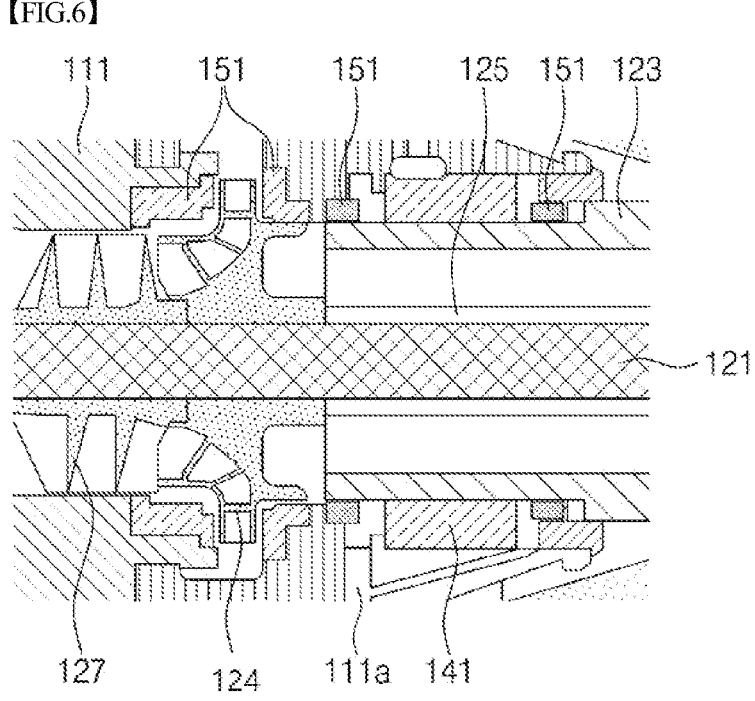

【FIG.7】
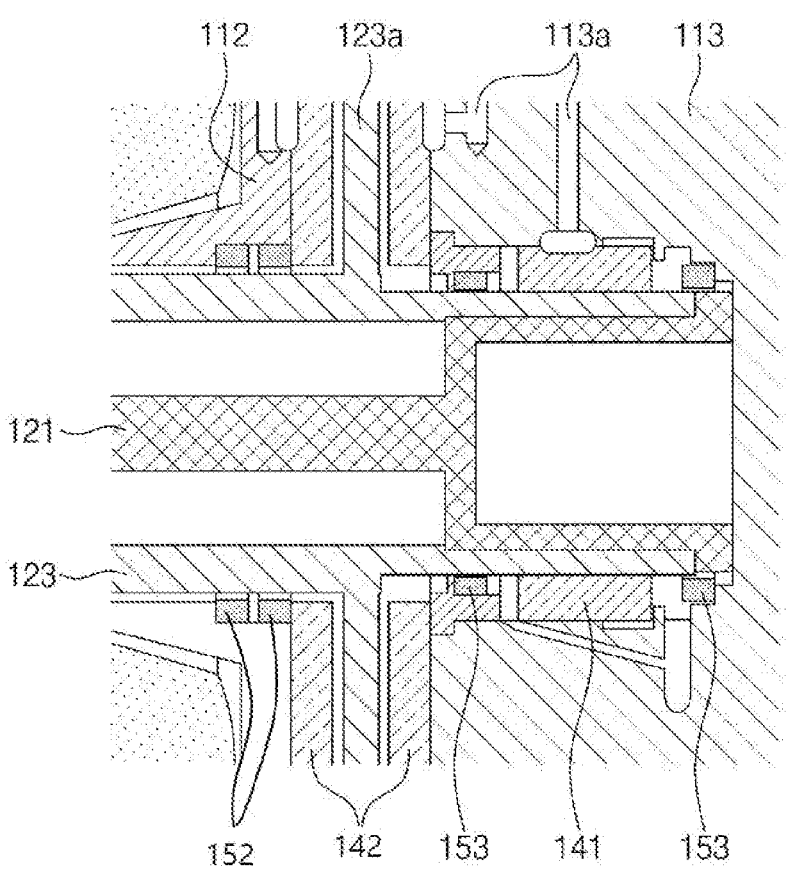

ELECTRIC MOTOR-INTEGRATED ROCKET ENGINE PUMP

TECHNICAL FIELD

The present invention relates to an electric motor-integrated rocket engine pump, and more specifically, to an electric motor-integrated rocket engine pump having a simple structure and the small number of parts so as to be easily manufactured and designed.

BACKGROUND ART

A turbo-pump type engine widely used as a liquid propellant rocket engine sends high-pressure liquid fuel and liquid oxidizer to a main combustor by using high-temperature gas from a gas generator, thereby obtaining thrust.

One example among space launch vehicle turbo pumps according to the related art has a structure in which an oxidizer (liquid oxygen) pump and a fuel pump-turbine assembly are connected by a coupling. The oxidizer pump and the fuel pump-turbine assemblies are each supported by two ball bearings.

The turbo pump according to the related art has a structure in which ball bearings are each inserted and fixed to both sides of an inducer and an impeller of a rotating shaft.

According to the related art, since it is difficult to reuse the ball bearing of the turbo pump due to problems in service lifespan and durability after rocket operation, there are limitations in application to a reused space launch vehicle. A turbo-pump type engine widely used as a liquid propellant rocket engine sends high-pressure liquid fuel and liquid oxidizer to a main combustor by using high-temperature gas from a gas generator, thereby obtaining thrust.

One example among space launch vehicle turbo pumps according to the related art has a structure in which an oxidizer (liquid oxygen) pump and a fuel pump-turbine assembly are connected by a coupling. The oxidizer pump and the fuel pump-turbine assemblies are each supported by two ball bearings.

The turbo pump according to the related art has a structure in which ball bearings are each inserted and fixed to both sides of an inducer and an impeller of a rotating shaft.

According to the related art, since it is difficult to reuse the ball bearing of the turbo pump due to problems in service lifespan and durability after rocket operation, there are limitations in application to a reused space launch vehicle.

DISCLOSURE

Technical Problem

One technical problem to be solved by the present invention is to provide an electric motor-integrated rocket engine pump having a simple structure and the small number of parts so as to be easily manufactured and designed.

The technical problem to be solved by the present invention is not limited to the above description.

Technical Solution

In order to solve the above-mentioned technical problems, the present invention provides an electric motor-integrated rocket engine pump.

According to one embodiment, the electric motor-integrated rocket engine pump includes: a housing; a rotating body provided in one direction inside the housing; an electric motor provided inside the housing and integrally shaft-coupled to the rotating body; and a plurality of fluid bearings are mounted on front and rear rotating bodies of the electric motor to support rotation of the rotating body.

According to one embodiment, the rotating body may include: a center shaft extending in one direction; a permanent magnet provided in a circumferential direction on an outer circumferential surface of the center shaft; a journal for casing the center shaft, which is provided with the permanent magnet the circumferential direction on the outer circumferential surface, in the longitudinal direction; and an impeller connected to a front end of the journal in the longitudinal direction, and provided on the outer circumferential surface of the center shaft protruding from the front end of the journal in the longitudinal direction.

According to one embodiment, the housing may include a first housing, a second housing, and a third housing sequentially coupled in the longitudinal direction of the rotating body.

According to one embodiment, the first housing may encase the impeller and one fluid bearing provided on an outer circumferential surface of the journal in the longitudinal direction among the fluid bearings, and have a first flow path for supplying lubricating fluid to the one fluid bearing, in which the one fluid bearing may be a fluid journal bearing.

According to one embodiment, the electric motor-integrated rocket engine pump further includes a first seal member, wherein the first seal member may be disposed on front and rear sides of the impeller inside the first housing, and front and rear sides of the one fluid bearing.

According to one embodiment, the second housing may be coupled to a rear end of the first housing so as to encase the electric motor and one fluid bearing provided face a front side of a thrust disc provided outward in a radial direction from a rear end of the journal in the longitudinal direction among the fluid bearings, and may have a cooling flow path for cooling the electric motor and a second flow path for supplying lubricating fluid to the one fluid bearing, in which one of the fluid bearings may be a fluid thrust bearing.

According to one embodiment, the electric motor-integrated rocket engine pump may further include a second seal member, wherein the second seal member may be disposed on the front side of the one fluid bearing provided to face the front side of the thrust disc inside the second housing.

According to one embodiment, the third housing may be coupled to arear end of the second housing so as to encase, among the fluid bearings at the rear end of the journal in the longitudinal direction, one fluid bearing provided to face the rear side of the thrust disc provided outward in the radial direction from the rear end of the journal in the longitudinal direction, and the other fluid bearing provided on the outer circumferential surface of the rear end of the journal in the longitudinal direction at the rear of the one fluid bearing, and may have a third flow path for supplying lubricating fluid to the one fluid bearing and the other fluid bearing, in which the one fluid bearing may be a fluid thrust bearing, and the other fluid bearing may be a fluid journal bearing.

According to one embodiment, the electric motor-integrated rocket engine pump may further include a third seal member, wherein the third seal member may be disposed on the rear side of the one fluid bearing provided to face the rear side of the thrust disc inside the third housing, and the front and rear sides of the other fluid bearing.

According to one embodiment, the fluid bearings may include two fluid journal bearings and two fluid thrust bearings, in which one of the two fluid journal bearings is provided on the outer circumferential surface of the front end in the longitudinal direction of the rotating body, a remaining one is provided on the outer circumferential surface of the rear end in the longitudinal direction of the rotating body, and the two fluid thrust bearings may be provided to face both side surfaces of the thrust disc provided outward in the radial direction from the rear end of the rotating body in the longitudinal direction.

According to one embodiment, the rotating body may further include: first side caps and second side caps for capping longitudinal both ends of the permanent magnet provided on the outer circumferential surface of the center shaft in the circumferential direction, respectively; an inducer connected to the front end of the impeller and provided on the outer circumferential surface of the center shaft protruding from the front end of the impeller; and a nut fastened to the outer circumferential surface of the front end of the center shaft in the longitudinal direction in a front of the inducer, wherein the center shaft, permanent magnet, journal, impeller, first side cap, second side cap, and inducer, which are temporarily coupled to each other, may be integrally assembled by the nut.

According to one embodiment, a blocking disc for blocking a movement of the second side cap in the longitudinal direction may protrudes outward in the radial direction on one side of the outer circumferential surface of the center shaft in the longitudinal direction.

According to one embodiment, the center shaft may have a step in the circumferential direction on one side in the longitudinal direction, the step blocks a movement of the first side cap coupled to the outer circumferential surface of the center shaft in the longitudinal direction, and a gap may be generated between the first side cap and the step due to an accumulation tolerance when the center shaft, the permanent magnet, the journal, the impeller, the first side cap, the second side cap, and the inducer are finally assembled by the nut.

According to one embodiment, the center shaft may have a diameter smaller than a diameter of the journal, in which the rear end of the center shaft in the longitudinal direction may have an outer diameter coming into close contact with an inner diameter of the journal.

According to one embodiment, the center shaft may have an outer diameter relatively smaller than an inner diameter of the journal, and an empty space may be provided between the journal and a portion other than one side portion of the center shaft to which the permanent magnet, the first side cap and the second side cap are fastened.

The embodiment of the present invention may include: a housing; a rotating body provided in one direction inside the housing; an electric motor provided inside the housing and integrally shaft-coupled to the rotating body; and a plurality of fluid bearings are mounted on front and rear rotating bodies of the electric motor to support rotation of the rotating body.

Advantageous Effects

Therefore, the electric motor-integrated rocket engine pump may be provided, so that a structure can be simplified and the manufacture and design can be easily implemented due to the small number of parts.

According to the embodiment of the present invention, a structure of the rocket engine can be simplified, launch weight can be reduced and energy efficiency can be increased.

In addition, according to the embodiment of the present invention, the rotating body is stably supported by a plurality of fluid bearings, so that high reliability enough to be used for reusable space launch vehicles can be ensured.

DESCRIPTION OF DRAWINGS

FIG. 1 a sectional view showing an electric motor-integrated rocket engine pump according to one embodiment of the present invention.

FIG. 2 is an exploded view of FIG. 1.

FIG. 3 is a sectional view showing a rotating body of the electric motor-integrated rocket engine pump according to one embodiment of the present invention.

FIG. is a reference view for explaining a sequence in which the rotating body of the electric motor-integrated rocket engine pump according to one embodiment of the present invention is assembled.

FIG. 5 is a partially enlarged view for explaining a coupling relationship between a first side cap and a sensor shaft in the rotating body of the electric motor-integrated rocket engine pump according to one embodiment of the present invention.

FIG. 6 is a partially enlarged view for explaining a coupling structure of a front end of the rotating body of the electric motor-integrated rocket engine pump according to one embodiment of the present invention.

FIG. 7 is a partially enlarged view for explaining a coupling structure of a rear end of the rotating body of the electric motor-integrated rocket engine pump according to one embodiment of the present invention.

BEST MODE

Mode for Invention

Hereinafter, preferred embodiments of the present invention will be described in detail with reference to the accompanying drawings. However, the technical idea of the present invention is not limited to the exemplary embodiments described herein and may be embodied in other forms.

Further, the embodiments are provided to enable contents disclosed herein to be thorough and complete and provided to enable those skilled in the art to fully understand the idea of the present invention.

In the specification, when one component is mentioned as being on another component, it signifies that the one component may be placed directly on another component or a third component may be interposed therebetween. In addition, in the drawings, shapes and sizes may be exaggerated to effectively describe the technical content of the present invention.

In addition, although terms such as first, second and third are used to describe various components in various embodiments of the present specification, the components will not be limited by the terms. The above terms are used merely to distinguish one component from another.

Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

FIG. 1 a sectional view showing an electric motor-integrated rocket engine pump according to one embodiment of the present invention. FIG. 2 is an exploded view of FIG. 1. FIG. 3 is a sectional view showing a rotating body of the electric motor-integrated rocket engine pump according to one embodiment of the present invention. FIG. 4 is a reference view for explaining a sequence in which the rotating body of the electric motor-integrated rocket engine pump according to one embodiment of the present invention is assembled. FIG. 5 is a partially enlarged view for explaining a coupling relationship between a first side cap and a sensor shaft in the rotating body of the electric motor-integrated rocket engine pump according to one embodiment of the present invention. FIG. 6 is a partially enlarged view for explaining a coupling structure of a front end of the rotating body of the electric motor-integrated rocket engine pump according to one embodiment of the present invention. FIG. 7 is a partially enlarged view for explaining a coupling structure of a rear end of the rotating body of the electric motor-integrated rocket engine pump according to one embodiment of the present invention.

As shown in FIGS. 1 and 2, an electric motor-integrated rocket engine pump 100 according to one embodiment of the present invention may include a housing 110, a rotating body 120, an electric motor 130 and a fluid bearing 140.

The housing 110 defines an exterior of the electric motor-integrated rocket engine pump 110 according to one embodiment of the present invention. The rotating body 120, the electric motor 130 and the fluid bearing 140 are accommodated inside the housing 110, so as to be protected from the external environment. To this end, the housing 110 may have an inside formed of a hollow.

According to one embodiment of the present invention, the housing 110 may include a first housing 111, a second housing 112 and a third housing 113.

The first housing 111, the second housing 112, and the third housing 113 may be sequentially coupled in a longitudinal direction of the rotating body 120 around the rotating body 120. A front end portion of the rotating body 120 in the longitudinal direction may be encased by the first housing 111, a rear end portion of the rotating body 120 in the longitudinal direction may be encased by the third housing 113, and a central portion of the rotating body 120 to which the electric motor 130 is integrally shaft-coupled may be encased by the second housing 112.

According to one embodiment of the present invention, the first housing 111 may have a front and a rear end opened in the longitudinal direction, and may be provided therein with a hollow communicating the front end and the rear end opened in the longitudinal direction with each other.

The first housing 111 may encase an impeller 124 of the rotating body 120 described later. In addition, the first housing 111 may support one fluid bearing 140 provided on an outer circumferential surface of a front end in the longitudinal direction of a journal 123 described later, among a plurality of fluid bearings 140 provided to support rotation of the rotating body 120.

The one fluid bearing 140 may be a fluid journal bearing 141 mounted in a ring-coupled form to an outer circumferential surface of the rotating body 120, and this will be described in more detail below.

In addition, the first housing 111 may have a first flow path 111a for supplying lubricating fluid to the fluid journal bearing 141.

The lubricating fluid may be working fluid pumped at a high pressure after being introduced through the impeller 124 described later. A portion of the working fluid pumped at the high pressure may be filled in a combustion chamber and provided as propulsion power of the rocket engine, the other portion may be supplied toward the fluid bearing 140 and used as lubricating fluid for lubricating the fluid bearing 140, and the remaining portion may be used as cooling fluid to cool the electric motor 130.

The working fluid may include liquid oxygen (LOX) and fuel, and the liquid oxygen and the fuel may function as working fluid, lubricating fluid and cooling fluid. Thus, the electric motor-integrated rocket engine pump 100 according to one embodiment of the present invention may be applied as a pump for the liquid oxygen (LOX) or the fuel pump.

In addition, the first flow path 111a may provide a moving passage for lubricating fluid. The first flow path 111a may be provided inside the first housing 111, and may have one end in the longitudinal direction communicating with an inner hollow of the first housing 111.

According to one embodiment of the present invention, the fluid journal bearing 141 may be disposed at one end side in the longitudinal direction of the first flow path 111a in the inner hollow of the first housing 111, so that the lubricating fluid moving through the first flow path 111a may be supplied to the fluid journal bearing 141.

According to one embodiment of the present invention, the second housing 112 may be coupled to the rear end of the first housing 111. Like the first housing 111, the second housing 112 may have a front and a rear end opened in the longitudinal direction, and may be provided therein with a hollow communicating the front end and the rear end opened in the longitudinal direction with each other.

When the second housing 112 is coupled to the rear end of the first housing 111, a hollow provided inside the second housing 112 may form a single flow path in one direction with the hollow provided inside the first housing 111.

According to one embodiment of the present invention, the rotating body 120 may be mounted in the single flow path formed by the hollow provided inside the second housing 112 and the hollow provided inside the first housing 111.

The second housing 112 may encase a central portion of the rotating body 120. Accordingly, the second housing 112 may encase the electric motor 130 integrally shaft-coupled to one side of the rotating body 120 in the longitudinal direction.

In addition, the second housing 112 may, among the fluid bearings 140 provided to support the rotation of the rotating body 120, support one fluid bearing 140 provided in a form opposite to a front side of a thrust disc 123a provided in a form extending outward in a radial direction from a rear end in the longitudinal of the journal 123 described later.

The one fluid bearing 140 may be a fluid thrust bearing 142 for supporting an axial load of the rotating body 120, and this will be described in more detail below.

In addition, the second housing 112 may have a second flow path 112a for supplying the lubricating fluid to the fluid thrust bearing 142.

The second flow path 112a may provide a moving passage for the lubricating fluid. The second flow path 112a may be provided inside the second housing 112, and have one end in the longitudinal direction communicating with an inner hollow of the second housing 112.

According to one embodiment of the present invention, one end of the second flow path 112a in the longitudinal direction may be formed a rear end side of the inner hollow of the second housing 112 in the longitudinal direction. The fluid thrust bearing 142 may be disposed at the rear end side in the longitudinal direction of the inner hollow of the second housing 112.

Accordingly, the lubricating fluid moving through the second flow path 112a may be supplied to the fluid thrust bearing 142 to lubricate the fluid thrust bearing 142.

In addition, the second housing 112 may be further provided with a cooling flow path 112b. The cooling flow path 112b may be provided inside the second housing 112. The cooling flow path 112b may provide a moving passage for a cooling fluid to cool the electric motor 130.

According to one embodiment of the present invention, the cooling flow path 112b may be provided inside the second housing 112 in a form surrounding an outer circumferential surface of the electric motor 130 in order to improve cooling efficiency of the electric motor 130.

As described above, the lubricating fluid moving through the second flow path 112a and the cooling fluid moving through the cooling flow path 112b may be the working fluid introduced by the impeller 124 and pumped at the high pressure.

According to one embodiment of the present invention, the third housing 113 may be coupled to the rear end of the second housing 112. The third housing 113 may have a closed longitudinal rear end while having an opened longitudinal front end. A hollow communicating with the opened longitudinal front end may be provided inside the third housing 113 in the longitudinal direction.

When the first housing 111, the second housing 112, and the third housing 113 are sequentially coupled in the longitudinal direction, the inner hollow of the first housing 111, the inner hollow of the second housing 112, and the inner hollow of the third housing 113 may form a single flow path in one direction.

According to one embodiment of the present invention, the rotating body 120 may be mounted in the single flow path formed by the inner hollow of the first housing 111, the inner hollow of the second housing 112, and the inner hollow of the third housing 113, so as to be protected, from the external environment, by the housing 110 composed of the first housing 111, the second housing 112, and the third housing 113.

The third housing 113 may encase a rear end portion of the rotating body 120. In addition, the third housing 113, among the fluid bearings 140 provided to support the rotation of the rotating body 120, may support one fluid bearing 140 provided in a form facing a rear side of the thrust disc 123a provided outward in the radial direction from the rear end in the longitudinal of the journal 123 described later.

In addition, the third housing 113, among the fluid bearings 140 provided to support the rotation of the rotating body 120, may encase other fluid bearing 140 provided on an outer circumferential surface of a rear end in the longitudinal direction of the journal 123 described later at rear of the one fluid bearing 140.

The one fluid bearing 140 may be the fluid thrust bearing 142 for supporting the axial load of the rotating body 120.

In addition, the other fluid bearing 140 may be a fluid journal bearing 141 mounted in a ring-coupled form to the outer circumferential surface of the rotating body 120, and those will be described in more detail below.

In addition, the third housing 113 may have a third flow path 113a for supplying the lubricating fluid to the fluid thrust bearing 142 and the fluid journal bearing 141.

The third flow path 113a may provide a moving passage for the lubricating fluid. The third flow path 113a may be provided inside the third housing 113a. Ends in the longitudinal direction of the third flow path 113a may be branched into both branches. The ends in the longitudinal direction of the third flow path 113a branched into the two branches may communicate with the inner hollow of the third housing 113.

The fluid thrust bearing 142 may be disposed at one end side of the branched third flow path 113a. Accordingly, the lubricating fluid moving through the one end of the third flow path 113a may be supplied to the fluid thrust bearing 142 to lubricate the fluid thrust bearing 142.

In addition, the fluid journal bearing 141 may be disposed at the other end side of the branched third flow path 113a. Accordingly, the lubricating fluid moving through the other end of the third flow path 113a may be supplied to the fluid journal bearing 141 to lubricate the fluid journal bearing 141.

Continuing to refer to FIGS. 1 and 2, the rotating body 120 may be provided in one direction inside the housing 110. A front end portion of the rotating body 120 in the longitudinal direction may be encased by the first housing 111, a rear end portion in the longitudinal direction may be encased by the third housing 113, and a central portion may be encased by the second housing 112.

Referring to FIG. 3, the rotating body 120 according to one embodiment of the present invention may be composed of a center shaft 121, a permanent magnet 122, a journal 123, an impeller 124, a first side cap 125, a second side cap 126, an inducer 127 and a nut 128.

Referring to FIG. 4, in order to assemble the rotating body 120 according to one embodiment of the present invention, the second side cap 126 and the permanent magnet 122, first, may be sequentially fastened to an outer circumferential surface of the center shaft 121. Thereafter, in order to cap the other end in the longitudinal direction of the permanent magnet 122 having one end in the longitudinal direction capped by the second side cap 126, the first side cap 125 may be fastened to the outer circumferential surface of the center shaft 121 to cap the other end in the longitudinal direction of the permanent magnet 122.

Thereafter, the center shaft 121 to which the second side cap 126, the permanent magnet 122 and the first side cap 125 are fastened may be encased to the outer circumferential surface in the longitudinal direction through the journal 123.

Thereafter, the impeller 124 and the inducer 127 may be sequentially fastened to an outer circumferential surface of a front end in the longitudinal direction of the center shaft 121 exposed to the outside from the center shaft 121 encased by the journal 123 in the longitudinal direction. The center shaft 121, the permanent magnet 122, the journal 123, the impeller 124, the first side cap 125, the second side cap 126, and the inducer 127 may be temporarily coupled to each other.

Thus, finally, when a nut 128 is fastened to the outer circumferential surface of the front end in the longitudinal direction of the center shaft 121, the center shaft 121, the permanent magnet 122, the journal 123, the impeller 124, the first side cap 125, the second side cap 126 and the inducer 127 may be integrally assembled, so that the rotating body 120 according to one embodiment of the present invention may be formed.

Referring to FIGS. 3 to 5, the center shaft 121 may extend in one direction. The permanent magnet 122, the journal 123, the impeller 124, the first side cap 125, the second side cap 126, the inducer 127 and the nut 128 may be fastened to the outer circumferential surface of the center shaft 121.

In other words, the center shaft 121 may provide a mounting space for the permanent magnet 122, the journal 123, the impeller 124, the first side cap 125, the second side cap 126, the inducer 127, and the nut 128.

The front end in the longitudinal direction of the center shaft 121 encased by the journal 123 may protrude more than the front end of the journal 123.

As described above, when the rotating body 120 is assembled, the second side cap 126, first, may be fastened to the outer circumferential surface of the center shaft 121. A blocking disc 121a may be provided on one side of the outer circumferential surface in the longitudinal direction of the center shaft 121 such that a fastening position of the second side cap 126 is determined on the outer circumferential surface of the center shaft 121.

The blocking disc 121a may protrude outward in the radial direction from the one side of the outer circumferential surface in the longitudinal direction of the center shaft 121. For example, the blocking disc 121a may be provided in a disc shape.

When the second side cap 126 is slid and fastened to the outer circumferential surface of the center shaft 121, the slid second side cap 126 may collide with the blocking disc 121a. Accordingly, the movement of the second side cap 126 may be blocked by the blocking disc 121a.

Thus, according to one embodiment of the present invention, the second side cap 126 may be mounted on the outer circumferential surface of the center shaft 121 in close contact with the disc 121a in forward and backward directions.

In addition, the center shaft 121 may have a step 121b in a circumferential direction on one side in the longitudinal direction. According to one embodiment of the present invention, one side and the other side of the center shaft 121 in the longitudinal direction may have different diameters. Accordingly, the step 121b may be formed at a portion in which the one side and the other side having different diameters in the longitudinal direction meet each other.

The step 121b may block the movement of the first side cap 125 fastened to the outer circumferential surface of the center shaft 121 in the longitudinal direction. When the center shaft 121, the permanent magnet 122, the journal 123, the impeller 124, the first side cap 125, the second side cap 126 and the inducer 127 are finally assembled by the nut 128, a gap G may be generated between the first side cap 125 and the step 121b due to an accumulation tolerance.

In addition, as shown in the drawing, a diameter of the center shaft 121 may be smaller than a diameter of the journal 123. Accordingly, when the center shaft 121 is encased in the longitudinal direction by the journal 123, an space between an outer diameter of the center shaft 121 and an inner diameter of the journal 123 remains as an empty space. In this case, a posture of the front end of the center shaft 121 in the longitudinal direction may be maintained by the permanent magnet 122, the first side cap 125 and the second side cap 126 fastened to the outer circumferential surface of the center shaft 121 and coming into close contact with the inner diameter of the journal 123.

According to one embodiment of the present invention, the outer diameter of the rear end of the center shaft 121 in the longitudinal direction may come into close contact with the inner diameter of the journal 123.

Accordingly, the posture of the center shaft 121 inside the journal 123 may be stably maintained by the permanent magnet 122, the first side cap 125 and the second side cap 126 coming into close contact with the inner diameter of the journal 123, and the structure of the rear end in the longitudinal direction that comes into close contact with the inner diameter of the journal 123.

In other words, according to one embodiment of the present invention, the rear end of the center shaft 121 in the longitudinal direction may have the largest diameter.

The permanent magnet 122 may be provided on the outer circumferential surface of the center shaft 121 in the circumferential direction. When the rotating body 120 is assembled, the permanent magnet 122 may be fastened to the outer circumferential surface of the center shaft 121 after the second side cap 126 is fastened to the outer circumferential surface of the center shaft 121, and may be capped by the first side cap 125 thereafter. In other words, the permanent magnet 122 may be fixed to the outer circumferential surface of the center shaft 121 by the first side cap 125 and the second side cap 126.

The journal 123 may encase the center shaft 121, which is provided with the permanent magnet 122 on its outer circumference in the circumferential direction, in the longitudinal direction. To this end, the journal 123 may be provided as a hollow cylinder.

The journal 123 may have an inner diameter relatively larger than the outer diameter of the center shaft 121. Accordingly, even when the center shaft 121 is inserted into the journal 123, an empty space is present between the journal 123 and the center shaft 121.

Accordingly, since the inner diameter of the journal 123 is relatively larger than the outer diameter of the center shaft 121, the permanent magnet 122, the first side cap 125 and the second side cap 126 may be fastened to the outer circumferential surface of the center shaft 121, and the journal 123 may encase all of the above components.

According to one embodiment of the present invention, the journal 123 may have a length shorter than that of the center shaft 121. Accordingly, when the journal 123 encases the center shaft 121, the front end portion of the center shaft 121 may be exposed to the outside. In other words, the front end portion of the center shaft 121 may be exposed toward the front side of the journal 123.

According to one embodiment of the present invention, the thrust disc 123a may be provided at the rear end of the journal 123 in the longitudinal direction. The thrust disc 123a may be provided in a form extending outward in the radial direction of the journal 123.

In other words, the thrust disc 123a may be provided to have a semicircular shape with an opened center, and the thrust disc 123a may be ring-coupled to the outer circumferential surface of the journal 123.

According to one embodiment of the present invention, the thrust disc 123a may be arranged to face the two fluid thrust bearings 142 in the axial direction, and an axial load of the rotating body 120 may be supported by the fluid thrust bearing 142.

The impeller 124 may be provided at the front end of the journal 123 in the longitudinal direction. The impeller 124 may come into close contact with and be connected to the front end of the journal 123 in the longitudinal direction. The impeller may be mounted on an outer circumferential surface of a front end portion exposed to the outside from the center shaft 121 encased by the journal 123.

Thus, according to one embodiment of the present invention, the center shaft 121 may serve as a rotation shaft of the electric motor 130 as well as a rotation shaft of the impeller 124.

Therefore, the electric motor-integrated rocket engine pump 100 having a simple structure and the small number of parts so as to be easily manufactured and designed may be provided.

In addition, the first side cap 125 and the second side cap 126 may cap both ends in the longitudinal direction of the permanent magnets 122 provided in the circumferential direction on the outer circumferential surface of the center shaft 121, respectively. To this end, the first side cap 125 and the second side cap 126 may be fastened to the outer circumferential surface of the center shaft 121 with the permanent magnet 122 interposed therebetween.

The first side cap 125 and the second side cap 126 fastened to the outer circumferential surface of the center shaft 121 may come into close contact with the inner diameter of the journal 123, and accordingly, the posture of the center shaft 121 may be stably maintained.

The inducer 127 may be provided at the front end of the impeller 124. The inducer 127 may be connected to the impeller 124 in a form in close contact with the front end of the impeller 124. The inducer 127 may be mounted on the outer circumferential surface of the center shaft 121 protruding from the front end of the impeller 124.

The nut 128 may be fastened to the outer circumferential surface of the front end of the center shaft 121 in the longitudinal direction in a front of the inducer 127.

Accordingly, when the nut 128 is finally fastened to the center shaft 121, the center shaft 121, the permanent magnet 122, the journal 123, the impeller 124, the first side cap 125, the second side cap 126 and the inducer 127 may be integrally assembled, so that the rotating body 120 according to one embodiment of the present invention may be formed.

Referring back to FIGS. 1 and 2, the electric motor 130 may be provided inside the housing 110. More particularly, the electric motor 130 may be encased by the second housing 112.

According to one embodiment of the present invention, the electric motor 130 may be integrally shaft-coupled to the rotating body 120.

The electric motor 130 may include the permanent magnet 122 serving as arotor for rotating the center shaft 121, and a stator 131 provided in a ring-coupled around the permanent magnet 122 and having a stator winding 131a.

A plurality of fluid bearing 140 may be mounted at front and rear sides on the rotating body 120 in order to support the rotation of the rotating body 120.

According to one embodiment of the present invention, the fluid bearings 140 may include two fluid journal bearings 141 and two fluid thrust bearings 142.

However, this is only the example, and the present invention does not particularly limit the number of used fluid bearings 140.

Hereinafter, for convenience of description, it is assumed that two fluid journal bearings 141 and two fluid thrust bearings 142 are provided.

According to one embodiment of the present invention, one fluid journal bearing 141 of the two fluid journal bearings 141 may be provided on the outer circumferential surface of the front end of the rotating body 120 in the longitudinal direction. The fluid journal bearing 141 provided on the outer circumferential surface of the front end of the rotating body 120 in the longitudinal direction may be encased by the first housing 111.

Accordingly, the fluid journal bearing 141 provided on the outer circumferential surface of the front end of the rotating body 120 in the longitudinal direction may be supplied with the lubricating fluid through the first flow path 111a provided in the first housing 111.

In addition, the other fluid journal bearing 141 of the two fluid journal bearings 141 may be provided on the outer circumferential surface of the rear end of the rotating body 120 in the longitudinal direction. The fluid journal bearing 141 provided on the outer circumferential surface of the rear end of the rotating body 120 in the longitudinal direction may be encased by the third housing 113.

Accordingly, the fluid journal bearing 141 provided on the outer circumferential surface of the rear end of the rotating body 120 in the longitudinal direction may be supplied with the lubricating fluid through the third flow path 113a provided in the third housing 113.

In addition, according to one embodiment of the present invention, the two fluid thrust bearings 142 be provided to face the rotation body 120, more specifically, the front and rear side surfaces of the thrust disc 123a provided outward in the radial direction from the rear end of the journal 123 in the longitudinal direction.

The fluid thrust bearing 142 provided to face the front side surface of the thrust disc 123a, of the two fluid thrust bearings 142, may be encased by the second housing 112.

Accordingly, the fluid thrust bearing 142 provided to face the front side surface of the thrust disc 123a may be supplied with the lubricating fluid through the second flow path 112a provided in the second housing 112.

In addition, the fluid thrust bearing 142 provided to face the rear side surface of the thrust disc 123a, of the two fluid thrust bearings 142, may be encased by the third housing 113.

Accordingly, the fluid thrust bearing 142 provided to face the rear side surface of the thrust disc 123a may be supplied with the lubricating fluid through the third flow path 113a provided in the third housing 113.

In addition, the electric motor-integrated rocket engine pump 100 according to one embodiment of the present invention may further include a seal member.

According to one embodiment of the present invention, the seal member may include a first sealing member 151, a second sealing member 152 and a third sealing member 153.

Referring to FIG. 6, the first seal member 151 may be mounted inside the first housing 111. The first seal member 151 may be provided in a ring shape and ring-coupled to an inlet surface and a rear surface, which are the front and rear sides of the impeller 124, into which the working fluid is introduced, so that the flow of the working fluid may be regulated.

In addition, the first seal member 151 may be ring-coupled to the outer circumferential surface of the journal 123 at the front and rear sides of the fluid journal bearing 141.

Referring to FIG. 7, the second seal member 152 may be mounted inside the second housing 112. The second seal member 152 may be disposed on a front side (left side of the drawing) of the fluid thrust bearing 142 provided to face the front side of the thrust disc 123*a*.

Specifically, the second seal member 152 may be provided in a ring shape and ring-coupled to the outer circumferential surface of the journal 123 at the front side (left side of the drawing) of the fluid thrust bearing 142 provided to face the front side of the thrust disc 123*a*.

Continuing to refer to FIG. 7, the third seal member 153 may be mounted inside the third housing 113. The third seal member 153 may be disposed on a rear side (right side of the drawing) of the fluid thrust bearing 142 provided to face the rear side of the thrust disc 123*a*.

Specifically, the third seal member 153 may be provided in a ring shape and ring-coupled to the outer circumferential surface of the journal 123 at the rear side of the fluid thrust bearing 142 provided to face the rear side of the thrust disc 123*a*.

In addition, the third seal member 153 may be disposed on the front and rear sides of the fluid journal bearing 141 provided on the rear end outer circumferential surface of the journal 123 in the longitudinal direction at a rear of the fluid thrust bearing 142.

Specifically, the third seal member 153 may be provided in a ring shape and ring-coupled to the outer circumferential surface of the journal 123 at the front and rear sides of the fluid journal bearing 141.

As described above, the electric motor-integrated rocket engine pump 100 according to one embodiment of the present invention may be integrally configured with the electric motor 130 and provided with the rotating body 120 that is supported by the fluid journal bearings 141 and the fluid thrust bearing 142 in the longitudinal direction.

Therefore, the electric motor-integrated rocket engine pump 100 having a simple structure and the small number of parts so as to be easily manufactured and designed may be provided.

When the electric motor-integrated rocket engine pump 100 is provided, a structure of the rocket engine can be simplified, launch weight can be reduced and energy efficiency can be increased.

According to one embodiment of the present invention, the rotating body 120 integrally configured with the electric motor 130 is stably supported by a plurality of fluid bearings 140, for example, the fluid journal bearings 141 and the fluid thrust bearings 142, so that high reliability enough to be used for reusable space launch vehicles can be ensured.

Although the present invention has been described in detail by using exemplary embodiments, the scope of the present invention is not limited to the specific embodiments, and will be interpreted by the appended claims. In addition, it will be apparent that a person having ordinary skill in the art may carry out various deformations and modifications for the embodiments described as above within the scope without departing from the present invention.

The invention claimed is:

1. An electric motor-integrated rocket engine pump comprising:

a housing;

a rotating body provided in a first direction inside the housing;

an electric motor provided inside the housing and integrally shaft-coupled to the rotating body; and a plurality of fluid bearings mounted on the rotating body to support rotation of the rotating body, wherein the rotating body includes:

a center shaft extending in the first direction;

a permanent magnet provided in a circumferential direction on an outer circumferential surface of the center shaft;

a journal for encasing the center shaft in a longitudinal direction; and an impeller connected to a front end of the journal in the longitudinal direction, and provided on a portion of the outer circumferential surface of the center shaft protruding from the front end of the journal in the longitudinal direction, wherein the rotating body further includes:

a first side cap and a second side cap for capping longitudinally both ends of the permanent magnet respectively;

an inducer connected to a front end of the impeller and provided on a portion of the outer circumferential surface of the center shaft that is protruding from the front end of the impeller; and a nut fastened to the portion of the outer circumferential surface of a front end of the center shaft in the longitudinal direction at a front of the inducer, and wherein the center shaft, the permanent magnet, the journal, the impeller, the first side cap, the second side cap, and the inducer, which are temporarily coupled to each other, are integrally assembled by the nut.

2. The electric motor-integrated rocket engine pump of claim 1, wherein the housing includes a first housing, a second housing, and a third housing sequentially coupled in a longitudinal direction of the rotating body.

3. The electric motor-integrated rocket engine pump of claim 2, wherein the first housing encases the impeller and one fluid bearing provided on an outer circumferential surface of the journal in the longitudinal direction among the plurality of fluid bearings, wherein the first housing has a first flow path for supplying lubricating fluid to the one fluid bearing, and wherein the one fluid bearing includes a fluid journal bearing.

4. The electric motor-integrated rocket engine pump of claim 3, further comprising a first seal member, wherein the first seal member is disposed on a front side and a rear side of the impeller that is inside the first housing, and wherein the first seal member is disposed on a front side and a rear side of the one fluid bearing.

5. The electric motor-integrated rocket engine pump of claim 2, wherein the second housing is coupled to a rear end of the first housing so as to encase the electric motor and one fluid bearing provided to face a front side of a thrust disc provided outward in a radial direction from a rear end of the journal in the longitudinal direction among the plurality of fluid bearings, wherein the second housing has a cooling flow path for cooling the electric motor and a second flow path for supplying lubricating fluid to the one fluid bearing, and wherein the one fluid bearing includes a fluid thrust bearing.

6. The electric motor-integrated rocket engine pump of claim 5, further comprising a second seal member, wherein the second seal member is disposed on the front side of the one fluid bearing.

7. The electric motor-integrated rocket engine pump of claim 2, wherein the third housing is coupled to a rear end of the second housing so as to encase, among the plurality of fluid bearings, one fluid bearing provided to face a rear side of a thrust disc provided outward in the radial direction from a rear end of the journal in the longitudinal direction; and another fluid bearing provided on the outer circumferential surface of the rear end of the journal in the longitudinal direction at a rear of the one fluid bearing, wherein the third housing has a third flow path for supplying lubricating fluid to the one fluid bearing and the another fluid bearing, and wherein the another fluid bearing includes a fluid journal bearing.

8. The electric motor-integrated rocket engine pump of claim 7, further comprising a third seal member, wherein the third seal member is disposed on a rear side of the one fluid bearing and is disposed on a front side and a rear side of the another fluid bearing.

9. The electric motor-integrated rocket engine pump of claim 1, wherein the plurality of fluid bearings includes two fluid journal bearings and two fluid thrust bearings, wherein a first fluid journal bearing of the two fluid journal bearings is provided on an outer circumferential surface of a front end in a longitudinal direction of the rotating body, wherein a second fluid journal bearing of the two fluid journal bearings is provided on the outer circumferential surface of a rear end in the longitudinal direction of the rotating body, and wherein the two fluid thrust bearings are provided to face both side surfaces of a thrust disc provided outward in a radial direction from a longitudinal rear end of the rotating body.

10. The electric motor-integrated rocket engine pump of claim 1, wherein a blocking disc for blocking a movement of the second side cap in the longitudinal direction protrudes outward in a radial direction on one side of the outer circumferential surface in the longitudinal direction of the center shaft.

11. The electric motor-integrated rocket engine pump of claim 1, wherein the center shaft has a step in the circumferential direction on one side in the longitudinal direction, the step blocks a movement of the first side cap coupled to the outer circumferential surface of the center shaft in the longitudinal direction, and a gap is generated between the first side cap and the step due to an accumulation tolerance when the center shaft, the permanent magnet, the journal, the impeller, the first side cap, the second side cap, and the inducer are finally assembled by the nut.

12. The electric motor-integrated rocket engine pump of claim 1, wherein the center shaft has a diameter smaller than a diameter of the journal, and wherein a rear end of the center shaft in the longitudinal direction has an outer diameter coming into close contact with an inner diameter of the journal.

13. The electric motor-integrated rocket engine pump of claim 1, wherein the center shaft has an outer diameter smaller than an inner diameter of the journal, and an empty space is provided between the journal and a portion other than one side portion of the center shaft to which the permanent magnet, the first side cap and the second side cap are fastened.

* * * * *